Jan. 6, 1970   R. L. YAHNKE   3,487,927
METHOD AND APPARATUS FOR SEPARATING WATER AND OIL
Filed Oct. 2, 1967   2 Sheets-Sheet 1

INVENTOR.
Robert L. Yahnke
BY James F. Simons
ATTORNEY

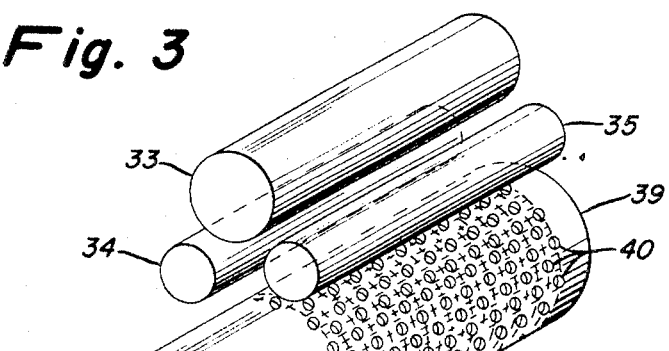
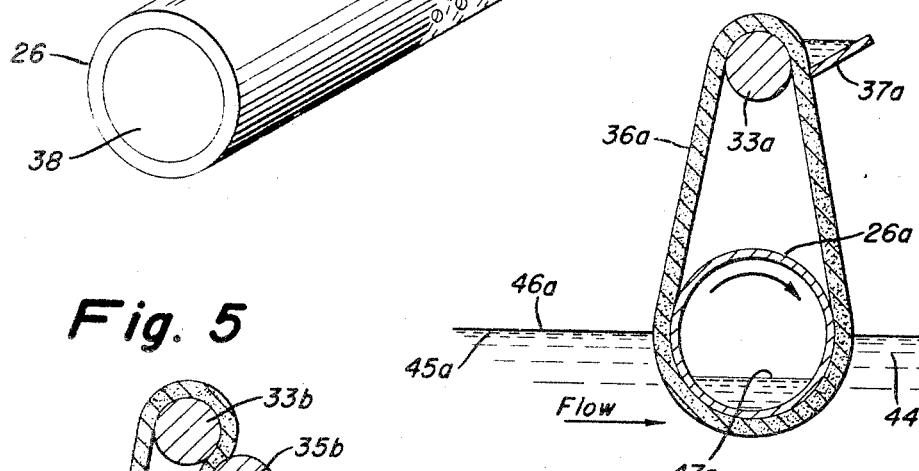
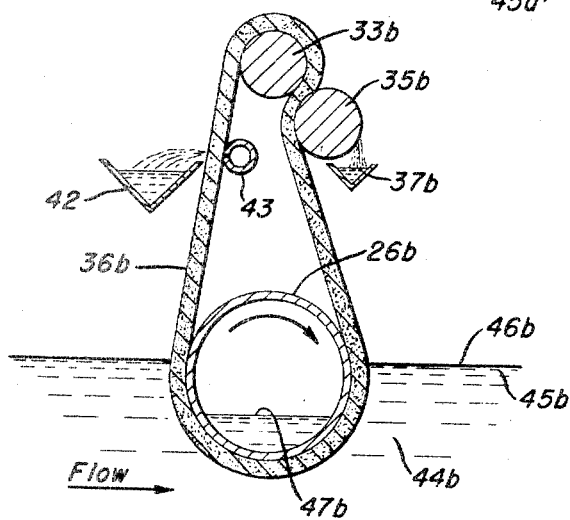

United States Patent Office 3,487,927
Patented Jan. 6, 1970

3,487,927
METHOD AND APPARATUS FOR SEPARATING WATER AND OIL
Robert L. Yahnke, Munster, Ind., assignor to Standard Oil Company, Chicago, Ill., a corporation of Indiana
Filed Oct. 2, 1967, Ser. No. 672,294
Int. Cl. B01d 15/06
U.S. Cl. 210—30   13 Claims

ABSTRACT OF THE DISCLOSURE

A power-driven apparatus having a continuous resilient plastic belt, a perforated cylinder, and a plurality of rollers for sequentially accepting water and oil, removing the water, removing the oil to form a regenerative volume of resilient porous material ready to receive additional amounts of water and oil.

BACKGROUND OF THE INVENTION

The present invention concerns method and apparatus for separating liquid hydrocarbon compounds from water and other immiscible liquids. Specifically, this invention concerns the separation of oil and oil-base compounds from the surface of bodies of water and the removal of droplets of oil dispersed throughout a body of water.

The conservation of environmental resources on a world-wide basis has over the past two decades become a greater and greater problem. The conservation of water as one of our most important environmental resources presents a major problem today. One facet of this problem concerns the removal of hydrocarbons from bodies of water in the continuing attempt to combat stream, lake, and sea coast pollution irrespective of the myriad of sources of the hydrocarbon pollutant.

Many mechanical separating devices and methods have been devised as exemplified by the art to perform some degree of water/oil separation. For example, floating booms for capturing and collecting spill for maintenance within a confined area has long been known and practiced; however, there remains the problem of separation of the water and oil. Barges having various types of skimming devices mounted thereon to skim the surface of the water in contact with the lower surface of the spill layer have long been known and used to a limited extent despite the obvious inherent problems. Other devices depend upon the differential gravity of water and oil to accomplish the separation with the attendant problems including sudden changes in the level of water and/or oil which results in poor separation. There is always the problem of capturing large amounts of water with the recovered oil which requires additional work and expense to handle and separate. Generally, the known water/oil separation devices have the implicit limitation that a pool of oil must exist on the surface of the water in a nondispersed manner to obtain a useful oil recovery.

Other methods include the utilization of polymeric films to provide a mop effect by means of the surface attraction between the film and the oil. Also, sinking of the oil by spreading carbonized sand provides a temporary antipollution measure as does the application of an emulsifier such as a detergent to the surface of the water body supporting a pool of oil.

Some of the means and methods exemplified by the art include U.S. Patent No. 3,259,245 to Earle; a U.S. Patent No. 3,314,540 to Lane; a U.S. Patent No. 3,314,545 to Grabbe; and a British Patent No. 735,254 to Savell. None of the known art appears to suggest or render obvious the instant novel subject matter disclosed and claimed herein.

SUMMARY OF THE INVENTION

This invention, concerning method and apparatus for the separation of oil from the surface of water and the separation of dispersed droplets of oil from a body of water, includes in combination, a drive means, a moving means connected to the drive means, a regenerable absorption filter means connected to said moving means, regenerating means adjacent said absorption filter means for preferentially accepting and retaining oil in order to remove and separate oil from a water body.

The drive means can include any type of prime mover which can efficiently transmit power to the apparatus. The moving means can include a roller and/or a cylinder in contact with the regenerable absorption filter means, the latter being a relatively thick and wide sheet of resilient porous and permeable material of plastic origin having two of its opposite ends joined to form a hollow cylinder with open ends defining a movable cover for the moving means which can function as a belt type articulating member or a sheath for the moving means.

Within the purview of this invention the moving means can include a hollow perforated cylinder having a closed end and an open end, the cylinder rotatable about its longitudinal axis and a roller, also rotatable, about its longitudinal axis, the cylinder and the roller annularly spaced within the regenerable absorption filter means so that the filter means resembles and functions as a wide member articulating about the cylinder and the roller. Alternately, the regeneration absorption filter means having a shape defined as a sheet having opposite ends joined to form a hollow open ended cylinder may be mounted on a rigid cylinder to form a sheath.

The regenerating means within the purview of this invention includes structure that functions as a wringer. The regenerating means can include a plurality of rollers in contact with the regenerable absorption filter means and a means for moving the oil and other impurities from the system, such as a trough. Alternately, the regenerating means can be a series of jets of water directed through the regenerable absorption filter means for removing particulate impurities from said filter means and a roller in contact with said filter means and pressing said filter means to remove the oil and other impurities in the regeneration of the filter means. Each of the elements including the series of jets and the roller can have troughs for collecting and removing the impurities from the system. The regenerating means can include a bladelike member pressing against the filter means and simultaneously forming a trough by its orientation for the removal of oil and other impurities from the filter means and the transportation of the removed material from the system. Within the purview of this invention, another embodiment includes a single roller pressing against the filter means and a means for transporting from the system the impurities removed from the filter means.

Within the purview of this invention, there are included the steps of flowing a fluid such as water containing an immiscible fluid such as oil through a regenerable absorption filter means, preferentially wetting the internal surfaces of the regenerable absorption filter means with said oil while the accompanying water or other substantially immiscible fluid passes therethrough moving said filter means to a regenerating means and regenerating said filter means by removing the oil and accompanying impurities.

BRIEF DESCRIPTION OF THE DRAWING

A more complete understanding of the structural elements of the novel subject matter described and claimed

Figure 1:
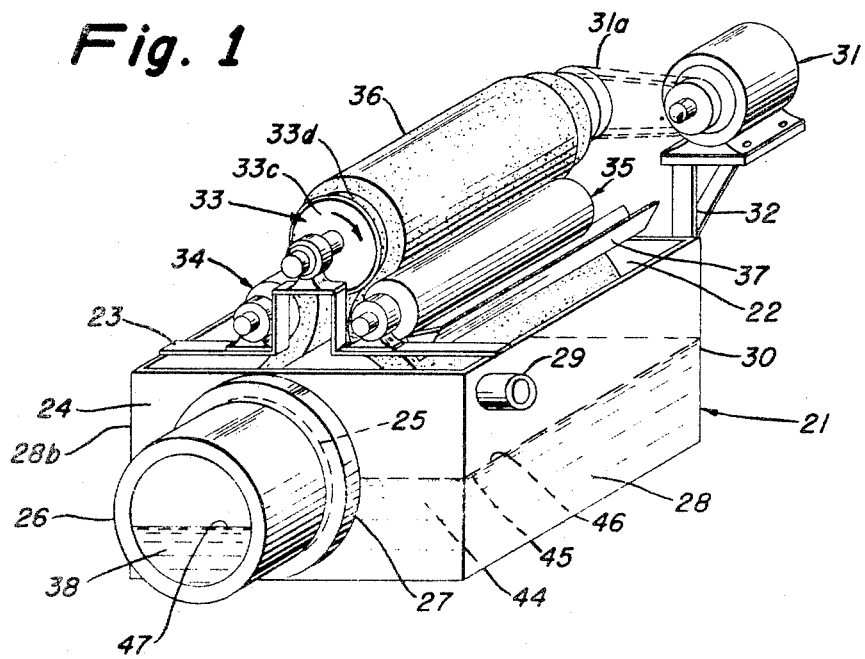
Figure 2:
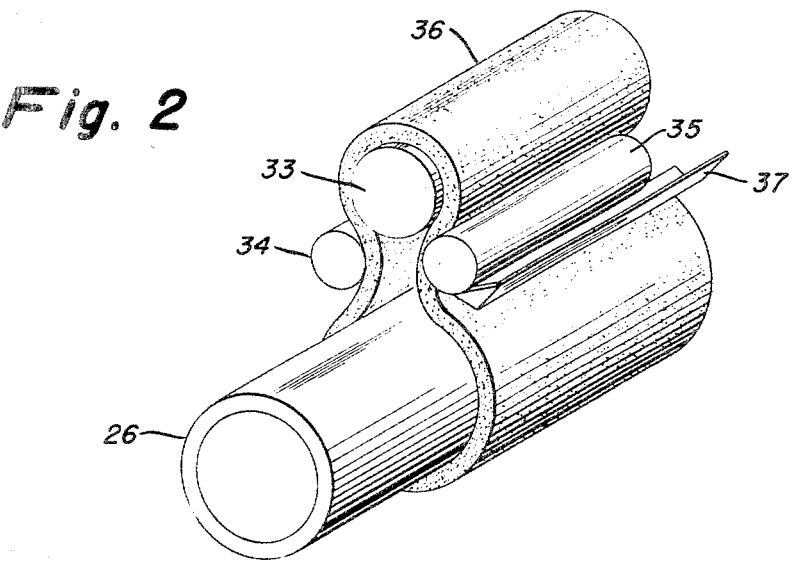

3 herein will be augmented by reference to the attached drawing wherein:

FIG. 1 is a perspective view of the apparatus for separating oil and water;

FIG. 2 is a perspective view of the filter means, moving means, and regenerating means shown in FIG. 1;

FIG. 3 is a perspective view of the moving means and regenerating means shown in FIGS. 1 and 2;

FIG. 4 is a sectional elevation view of an embodiment of the invention; and

FIG. 5 is a sectional elevation view of another embodiment of this invention.

DESCRIPTION OF A PREFERRED EMBODIMENT

Referring to FIG. 1, 21 numerically designates a tank having an open top 22 and support means 23. A first end 24 of tank 21 has an opening 25 to accommodate the rotating perforated cylinder 26 held in place by bushing seal 27. A first side 28 of the tank 21 is equipped with an opening 29 for supplying oil and water to the tank. A second end 30 of tank 21 has a motor 31 supported by member 32 attached to the second end 30.

Within tank 21 and rotatably mounted on support 23 is upper cylindrical roller 33, and cylinder 26 which comprise the moving means. The moving means is connected to the drive means which includes motor 31 and power transfer member 31a which can be directly connected to cylindrical roller 33 and cylinder 26. Numeral 36 designates the regenerable absorption filter means which in this configuration has a shape defined as a sheet with opposite ends joined to form a hollow open ended cylinder defining a movable cover for the moving means, said cover being capable of functioning as a belt type articulating member. The regenerating means of FIG. 1 includes in combination, rollers 34 and 35 respectively and trough 37 located adjacent roller 35.

FIG. 2 is a perspective view of the regenerable absorption filter means 36 covering the moving means including cylindrical roller 33 and cylinder 26 and the regenerating means including rollers 34 and 35 and trough 37, all in contact with the regenerable absorption filter means 36.

FIG. 3 is a perspective view depicting in greater detail the relative locations of the moving means including cylinder 26 and cylindrical roller 33, and part of the regenerating means including rollers 34 and 35. Cylinder 26 has an open end 38 and a closed end 39. Extending the width of filter means 36 from a point a short distance from closed end 39 on cylinder 26 are perforations 40 which extend through the wall of cylinder 26. The perforations 40 extending longitudinally along the wall of cylinder 26 for a distance substantially equal to the width of the filter means 36 are located in the area depicting hached marks 41 to portray either a rough surface on the exterior wall of cylinder 26 about perforations 40 or a layer of woven wire surrounding the perforated area to hold the inner surface of belt 36 above the perforations 40 to prevent the entry of the porous surface of the filter means 36 into the perforations 40 causing plugging of the perforations.

FIG. 4 is an additional embodiment of this invention. Regenerable absorption means 36a is shown in contact with moving means including cylindrical roller 33a and cylinder 26a. The regenerating means includes blade 37a which is in contact with the filter means 36a.

FIG. 5 is another embodiment of this invention. The moving means includes cylindrical roller 33b and cylinder 26b. The regenerable absorption filter means 36b is in contact with the moving means. The regenerating means is in contact with and adjacent to the filter means and includes the water jet distributor 43, trough 42, pressure roller 35b, and trough 37b.

In FIGS. 1 and 4–6 inclusive, 44 numerically designates water, numeral 46 designates oil, and the contact face therebetween is generally designated 45; however, it is within the purview of this invention and the numerical designations that the oil which is often dispersed below the water surface is such that numeral 46 is intended to include this dispersed oil. Similarly, in FIGS. 4 and 5 of the drawing, the water, oil, and contact faces are respectively designated a and b. In FIGS. 1, 4, and 5, numeral 47 generally designates the height of the water within cylinder 26. In FIGS. 4 and 5, the water level is designated within cylinders 26a and 26b as 47a and 47b respectively.

In operation, the novel apparatus described and claimed herein is powered by motor 31 which is suitably connected to roller 33 by a power transfer means 31a which can also be connected to cylinder 26.

For convenience the apparatus is depicted in the drawing, particularly FIG. 1, mounted within a tank having water and oil inlet 29 and filtered water outlet through the open end 38 of cylinder 26. The utilization of this novel apparatus is not restricted to a tank but may be located in a spillway or attached to apparatus for mobility for cleaning oil from water bodies.

In the embodiment shown in FIG. 1, water and oil can be introduced through the inlet 29 located in an upper corner of side 28 of tank 21. The height of the oily water is not critical; however, adequate submergence of cylinder 26 having the regenerable absorption filter means 36 covering said cylinder allows a differential head of water to exist between the higher interfacial contact 45 and water level 47 within cylinder 26. The greater height of the water outside cylinder 26 than inside cylinder 26 permits the existence of a head which provides the impetus for flow of the oily water into the regenerable absorption means and through the perforations of cylinder 26 where the clean water freely flows out of the open end 38 of cylinder 26.

As the regenerable absorption filter means 36 articulates about the perforated rotating cylinder 26, the existence of the differential head of water previously described provides the impetus for the oily water outside the cylinder 26 to flow through the filter means and into the interior of the cylinder 26. It is thought that by passing the water through the filter an action similar to pouring oily water on a filter means occurs. It is believed that the filter means is hydrophobic, that is, the highly porous and permeable material of the filter means has surfaces preferentially wetted by the oil. Thus, oil remains within the filter means while the water flows through it and the perforations 40 of cylinder 26 where the clean water freely flows out the open end 38 of the cylinder. Accordingly, the resistance to the flow of clean water through the filter means is apparently less than the resistance to the flow of the oil and impurities contained therein.

As the regenerable absorption filter means continues to articulate around the clockwise rotating cylinder 26, the filter means comes into contact with roller 34 which lightly presses the filter means to remove any water remaining therein. The filter means then articulates about the clockwise rotating cylindrical roller 33 and then against roller 35 which exerts a substantial pressure against the filter means to function as a wringer to remove the oil from the filter means. The oil removed from the filter means is caught by the trough 37 which transports the oil from the system. Thus, the articulating filter means has been regenerated by the regenerating means including rollers 34 and 35 and trough 37 in FIG. 1. After passing roller 35 the filter means being resilient is regenerated and ready to accept oil for the removal from water. Consequently, the apparatus and method of this invention specifically lends itself to the continuous separation of oil spills on water and oil dispersed in water. The apparatus is readily adaptable to installation within a spillway or other such orientation and adaptation where water containing oil and other impurities is continuously introduced, thereby necessitating the continuous separation. It is also within the purview of this invention that the novel apparatus and method may be utilized in any other manner such as attachment to apparatus for mobility for removing oil from water bodies.

In FIG. 1 a part of the moving means, cylindrical roller 33, is equipped at its end 33c with a strip of foamed material 33d, the thickness of which is substantially less than that of the regenerable absorption filter means 36. The foam strip 33d completely circles the cylindrical roller 33 and the strip extends under the adjoining edge of filter means 36 and the strip 33d is compressed at this point by the filter means 36. The strip of foam designated 33d has an exposed face forming a bevel dipping from end 33c downward to the adjoining edge of filter means 36. The foam 33d functions as a wiper to prevent the dripping of oil and other impurities from the cylindrical roller 33 and from roller 35, thus permitting full recovery and removal of oil and other impurities from the regenerable absorption filter means 36 and from the system.

The embodiments portrayed in FIGS. 4 and 5 are quite similar in their basic operation except that differences exist in their respective regenerating means. In FIG. 4, the regenerable absorption filter means 36a articulates about the moving means including cylindrical roller 33a and cylinder 26a. Oily water 44a, as shown in the arrow, flows toward the regenerable absorption filter means 36a as the filter means is in articulating motion about the clockwise rotating moving means. The difference in the water levels designated 45a and 47a respectively allows the oily water to flow through the filter means and the perforations 40 of cylinder 26a, thereby depositing the oil within the interstices of the filter means 36a as a result of the preferential wetting of the surfaces of said interstices of the filter means while allowing the water free of oil to continue its flow into the interior of cylinder 26a and out the open end of said cylinder. The filter means continuously moves carrying the oil lodged within the filter with little or substantially no water remaining. The regeneration means numerically designated 37a in FIG. 4 is shaped in the form of a thin plate or blade which presses against the surface of the filter means to function as a wringer removing the oil and impurities from the filter means. The blade 37a is slightly lower at one end so that it also functions as a trough so that the impurities removed from the filter means are transported from the system.

The embodiment of FIG. 5 incorporates a regenerating means including in combination, distributor jet 43 which sprays water through a regenerable absorption filter means 36b to remove particulate impurities therefrom which are carried by the water under pressure from the filter means to the collecting trough 42 which transports the water and particulate impurities away from the system. The regenerating means also includes roller 35b and trough 37b located adjacent to and below roller 35b. Roller 35b and trough 37b function as a wringer to remove the oil and other impurities from the filter means 36b and to collect the impurities so removed and transport them away from the system. In all other respects, the embodiment of FIG. 5 operates in a manner substantially similar to the embodiments depicted in FIGS. 1 and 4.

As shown in the drawing of the description of the embodiments, the regenerating means which removes the oil and other impurities from the filter means may include a myriad of different structures. The utilization of a plurality of rollers applying different pressures is shown. A bladelike member exerting pressure against the filter means has also been shown. The utilization of a liquid under pressure has been depicted by a figure of the drawing for removal of some impurities from the filter in a process separating oil and other impurities from water or other substantially immiscible fluid. The utilization of a singular roller cooperating with a collecting trough is also disclosed. Within the purview of this invention, the utilization of other types of regenerating means for regenerating the filter are contemplated. Among these might be the use of high pressure air or other fluid or the application of a vacuum to the filter for the removal of impurities taken from water or other medium cleaned.

The regenerable absorption filter means can be made from a highly porous and permeable, deformable, resilient, expanded polyurethane material or any other material which provides substantially the same physical characteristics and perform the same functions. The material used in this novel method and apparatus must perform the functions of a filter other than merely the functions of a mechanical filter. That is, the regenerable absorption filter means must exhibit hydrophobic properties while having physical characteristics which permit a large flow of water through the filter means, yet the filter material must have sufficient surface area outside and within the interstices to preferentially attract oil and other impurities while permitting the water to pass therethrough. The filter material must be deformable and resilient in order to withstand the regeneration which generally involves the deformation of the material as by squeezing, scraping, or wringing to remove the oil and impurities, although the filter means may be subjected to blasts of fluid or a vacuum to regenerate the material.

The instant invention provides a relatively simple apparatus and method which, among other additions, is characterized by its ability to function properly at considerably high speeds of operation with attendant high efficiency. Additionally, the apparatus is relatively inexpensive to manufacture and maintain and another advantage resides in its ease of operation to effectuate a superior separation of oil and other impurities from water.

The following examples illustrate the practice of the instant invention and further demonstrate the operation of the novel apparatus.

Example I

A demonstration model similar to that portrayed in FIG. 1 having a variable speed drive mechanism adjustable to rotate roller 33 at a speed within the range of less than one revolution per minute to more than 10 revolutions per minute was used to obtain operating data utilizing a 1 inch thick polyurethane foam belt having a circumference of about 32 inches and a width of about 8¾ inches. The oily water fed to tank 21 through inlet 29 contained a heavy crude and the water level 45 submerged the cylinder 26 about 75%. During operation, the following data shown in Table I below was obtained.

TABLE I.—REGENERABLE ABSORPTION FILTER FOR DE-OILING WATER-EFFECT OF WATER RATE

| | | | |
|---|---|---|---|
| Water rate, g.p.m | 7 | 9 | 12 |
| Oil rate, cc./min | 99 | 99 | 99 |
| Oil in feed, vol. percent | 0.4 | 0.3 | 0.2 |
| Belt speed, in./min | 7 | 7 | 7 |
| Head across filter, in. $H_2O$ | 1.1 | 1.4 | 1.9 |
| Oil carried by foam, qts./ft.$^3$ | 3.1 | 3.1 | 3.1 |
| Filtration rate, g.p.m/ft.$^2$ | 14 | 17 | 17 |
| Oil stream, vol. percent oil | 64 | 63 | 60 |

Example II

Additional data was obtained in a manner similar to that described in Example I except that some parameters were changed as reflected by the data portrayed in Table II below.

TABLE II.—REGENERABLE ABSORPTION FILTER FOR DE-OILING WATER-EFFECT OF BELT SPEED

| | | | | |
|---|---|---|---|---|
| Water rate, g.p.m | 12 | 12 | 12 | 9 |
| Oil rate, cc./min | 54 | 99 | 148 | 126 |
| Oil in feed, vol. percent | 0.1 | 0.2 | 0.3 | 0.4 |
| Belt speed, in./min | 4 | 7 | 9 | 7 |
| Effluent water | Clean | Clean | Clean | Clean |
| Head across filter, in. $H_2O$ | 1.7 | 1.9 | 1.9 | 1.3 |
| Oil carried by foam, qts./ft.$^3$ | 3.1 | 3.1 | 3.2 | 4.0 |
| Filtration rate, g.p.m./ft.$^2$ | 20 | 19 | 19 | 17 |
| Oil stream, vol. percent oil | 74 | 60 | 60 | 55 |

Based upon the data presented in Tables I and II and the testing represented by the compilations of data therein, it is readily seen that a commercial design employing 15 perforated cylinders each 8 feet long and 6 feet in diameter with 4 feet of submergence, having a filter means 4 inches in thickness travelling at 18 inches per minute where the head across the filter means is about 8 feet of water and the filtration rate is about 20 g.p.m./square foot and the oil carried by the foam is about 3.5 quarts per cubic foot, if the oily water rate is 40,000,000 gallons per day 1800 barrels per day of oil is recovered.

This invention is described by reference to the specific embodiments defined and claimed herein; however, it is understood that the embodiments are not intended to limit the scope of the invention, but these embodiments are presented only to teach the best modes contemplated for practicing this invention.

Having thus described the invention, what is claimed is:

1. A method of removing oil and other impurities from a body of water, comprising the steps of:
   (a) establishing a differential pressure across a porous and regenerable filter material and flowing water contaminated with said oil and other impurities through said porous and regenerable filter material, said filter material selectively absorbing the oil and other impurities while passing therethrough purified water free of significant quantities of oil and other impurities; drawing off said purified water after it flows through the filter; and
   (b) regenerating the filter material by removing the absorbed oil and other impurities, rendering said material reusable.

2. The method defined in claim 1 wherein said filter material is polyurethane.

3. The method defined in claim 2 wherein regenerating is accomplished by squeezing the filter material to liberate the absorbed oil.

4. The method defined in claim 3 wherein, prior to squeezing, a wash water is jetted into the filter material to remove particulate matter therefrom.

5. An apparatus for removing oil and other impurities from a body of water, comprising:
   a closed looped band of porous filter material which is preferentially wet by oil and releasably retains oil;
   drive means for moving the band through a circulatory path, partially submerging the band in the body of water, said drive means including a hollow, perforated cylinder which is inside the looped band and contacts the portion of the band submerged in the water;
   means for establishing a pressure head between the submerged portion of the band and the inside of the cylinder, whereby water flows through said band and said oil is entrapped in the pores of the band and moved to a remote position above the body of water as the band moves through said path, and said water leaves said band in a substantially purified state; means for drawing off said substantially purified water after it leaves the band,
   regenerating means of said remote position which removes the oil from the band; and
   means adjacent said regenerating means for collecting said removed oil.

6. The apparatus defined in claim 5 wherein said band is made of polyurethane.

7. The apparatus defined in claim 6 wherein said regenerating means includes at least one roller which squeezes said band to force the oil therefrom.

8. The apparatus defined in claim 6 wherein said regenerating means includes blade-like scraper means which squeeze said band to force the oil therefrom.

9. The apparatus defined in claim 6 wherein the regenerating means includes wringer means which remove oil, and sprayer means in advance of said wringer means which jet water into said band to wash particulate material therefrom.

10. A method for removing oil and other impurities from a body of water, comprising the steps of:
    (a) establishing a differential pressure across a porous, deformable, and resilient absorber material and passing water contaminated with said oil and other impurities through said absorber material, said absorber material being capable of attracting and releasably retaining said oil, whereby the absorber material absorbs oil and some water and passes therethrough purified water free of significant quantities of oil and other impurities; drawing off said purified water after it passes the absorber material;
    (b) withdrawing said absorber material to a remote position away from said body of water, and while said absorber material is at said remote position, applying thereto a first pressure which forces only water therefrom, and then applying thereto a second pressure, greater than said first pressure, which forces oil therefrom; and
    (c) collecting the oil which is forced from the absorber material.

11. The method defined in claim 10 wherein the absorber material is polyurethane.

12. An apparatus for removing oil from a body of water, comprising:
    porous, deformable, and resilient absorber means which is capable of attracting and releasably retaining said oil;
    means for establishing across said absorber means a differential pressure and passing water contaminated with said oil through said absorber means, whereby the absorber means absorbs oil and some water while passing therethrough purified water free of significant quantities of oil; means for drawing off said purified water after it passes through the absorber means;
    absorber regenerating means including first means which initially apply to said absorber means a first pressure that forces only water from the pores of the absorber means, and second means which engage said absorber means after said first means and apply to said absorber means a second pressure, greater than said first pressure, that forces the oil from the pores of the absorber means; and
    means adjacent said second means for collecting the oil which is forced from the pores of the absorber means.

13. The apparatus defined in claim 12 wherein the absorber means is made of polyurethane.

References Cited

UNITED STATES PATENTS

| | | | |
|---|---|---|---|
| 1,860,819 | 5/1932 | Schamberger | 210—523 X |
| 2,860,973 | 11/1958 | Wells | 210—396 X |
| 2,866,827 | 12/1958 | Jurgeleit et al. | 210—400 X |
| 2,881,127 | 4/1959 | Hetzel | 210—400 X |
| 3,314,540 | 4/1967 | Lane | 210—400 X |
| 3,334,042 | 8/1967 | Teitsma | 208—187 |
| 3,344,062 | 9/1967 | Kosar | 210—40 X |

FOREIGN PATENTS 1,026,201  4/1966  Great Britain.

SAMIH N. ZAHARNA, Primary Examiner

U.S. Cl. X.R.

208—187; 210—40, 77, 400